United States Patent [19]
Clack et al.

[11] Patent Number: 5,320,752
[45] Date of Patent: Jun. 14, 1994

[54] WATER PURIFICATION SYSTEM EMPLOYING MODULAR FLAT FILTER ASSEMBLY

[75] Inventors: Robert A. Clack, Sun Prairie; Richard E. Clack, Windsor, both of Wis.

[73] Assignee: Clack Corporation, Windsor, Wis.

[21] Appl. No.: 971,532

[22] Filed: Nov. 3, 1992

[51] Int. Cl.⁵ .................... B01D 15/00; B01D 27/02
[52] U.S. Cl. ........................ 210/282; 210/285; 210/288; 248/222.4
[58] Field of Search ............ 210/282, 286, 287, 288, 210/443, 444, 449, 455, 283; 248/222.4

[56] References Cited

U.S. PATENT DOCUMENTS

| | | | |
|---|---|---|---|
| 171,056 | 12/1875 | Sinclaire | 210/285 |
| 197,368 | 11/1877 | Hobson | 210/285 |
| 359,259 | 3/1887 | Kaiser | 210/285 |
| 499,815 | 6/1893 | Williams | 210/285 |
| 541,342 | 6/1895 | Bump | 210/286 |
| 1,186,608 | 6/1916 | Rankin | 210/286 |
| 1,951,917 | 3/1934 | Leslie | 210/286 |
| 2,300,014 | 10/1942 | Saussure | 210/282 |
| 3,159,368 | 12/1964 | Ahlbin et al. | 248/222.4 |
| 3,439,809 | 4/1969 | McPherren | 210/282 |
| 3,523,762 | 8/1970 | Broughton | 210/285 |
| 3,548,043 | 12/1970 | Held, Jr. | 264/545 |
| 3,950,251 | 4/1976 | Hiller | 210/282 |
| 3,982,406 | 9/1976 | Hanson et al. | 62/339 |
| 4,265,751 | 5/1981 | Willinger | 210/169 |
| 4,303,521 | 12/1981 | Lehmann | 210/282 |
| 4,515,692 | 5/1985 | Chandler et al. | 210/288 |
| 4,693,823 | 9/1987 | Matchett | 210/282 |
| 4,857,191 | 8/1989 | Wolf | 210/286 |
| 4,895,646 | 1/1990 | Willinger | 210/445 |
| 4,897,187 | 1/1990 | Rice | 210/282 |
| 4,930,696 | 6/1990 | Van Acker | 248/222.4 |
| 5,002,664 | 3/1991 | Clack et al. | 210/251 |
| 5,024,409 | 6/1991 | Bohnen | 248/222.4 |
| 5,116,502 | 5/1992 | Ferguson | 210/282 |
| 5,128,035 | 7/1992 | Clack et al. | 210/251 |
| 5,135,645 | 8/1992 | Sklenak et al. | 210/439 |
| 5,178,555 | 1/1993 | Kilpatrick et al. | 248/222.4 |
| 5,205,932 | 4/1993 | Solomon et al. | 210/283 |

FOREIGN PATENT DOCUMENTS 2153  3/1900  Austria ............................. 210/285

*Primary Examiner*—Stanley S. Silverman
*Assistant Examiner*—Cynthia L. Nessler
*Attorney, Agent, or Firm*—Nilles & Nilles

[57] ABSTRACT

A drinking water purification system includes a flat filter assembly which may be installed in relatively narrow spaces which would otherwise be wasted such as the space beside a kitchen cabinet and the basin of a kitchen sink, inside a freezer door or on a countertop. The filter assembly includes a housing, preferably U-shaped, having a plurality of transversely extending ribs, formed in the opposed side walls of the housing, which reinforce the housing and which cause a generally serpentine flow of water through the housing during operation of the filter. Protrusions preferably are formed in the housing in addition to the ribs to strengthen further the housing and to aid in preventing the formation of channels through the granulated filter medium contained within the housing. Internal or external quick connect couplers preferably connect the filter assembly to a source of untreated water and to a dispenser. An especially preferred external coupler includes an integral support element and devices for preventing water leakage when the filter assembly is disconnected from the coupler.

21 Claims, 11 Drawing Sheets

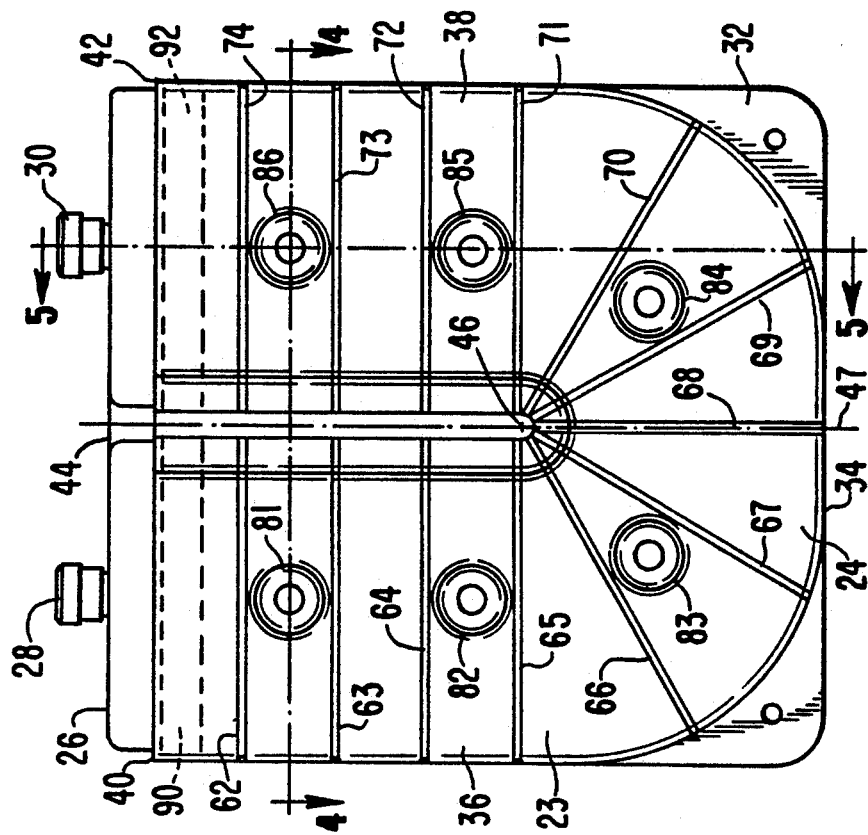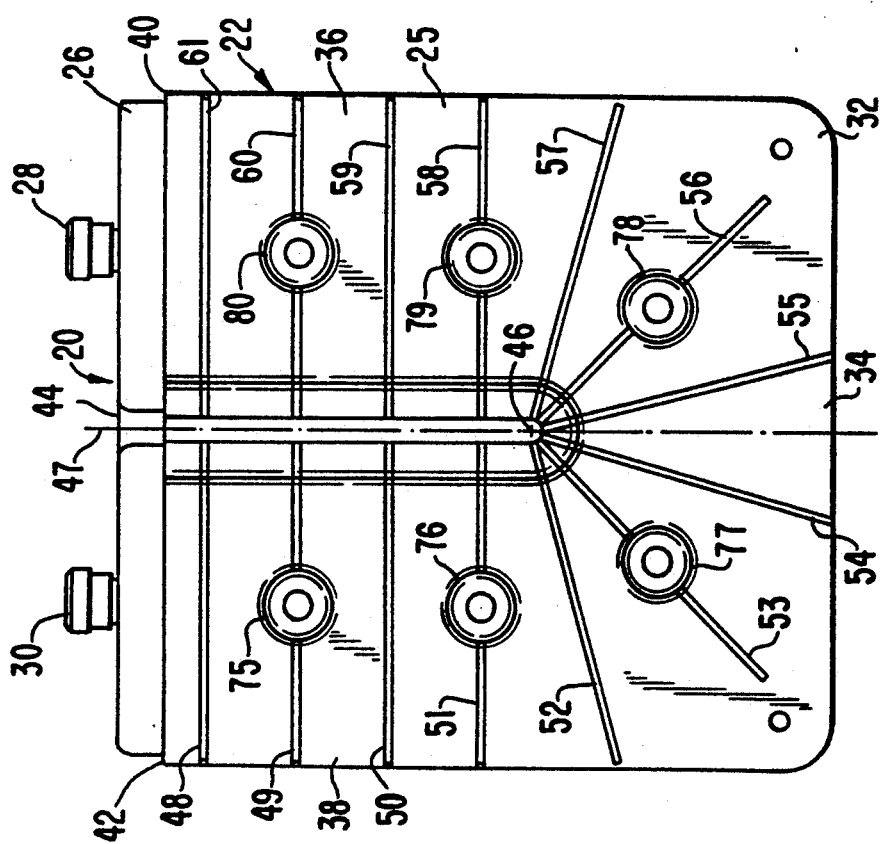

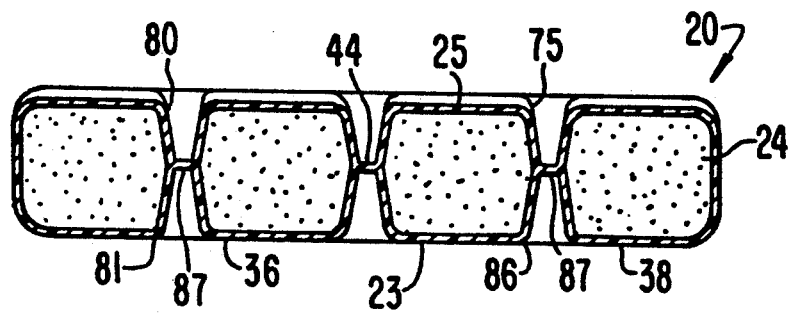
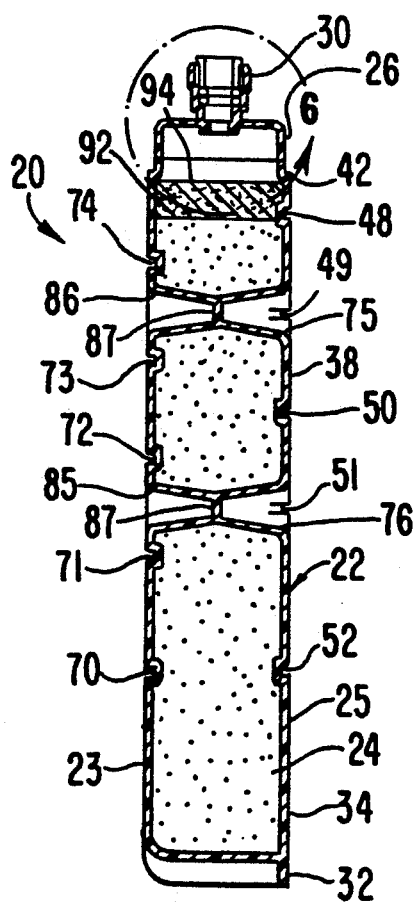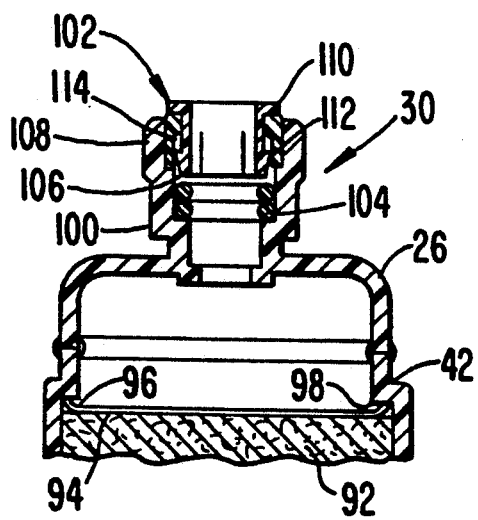

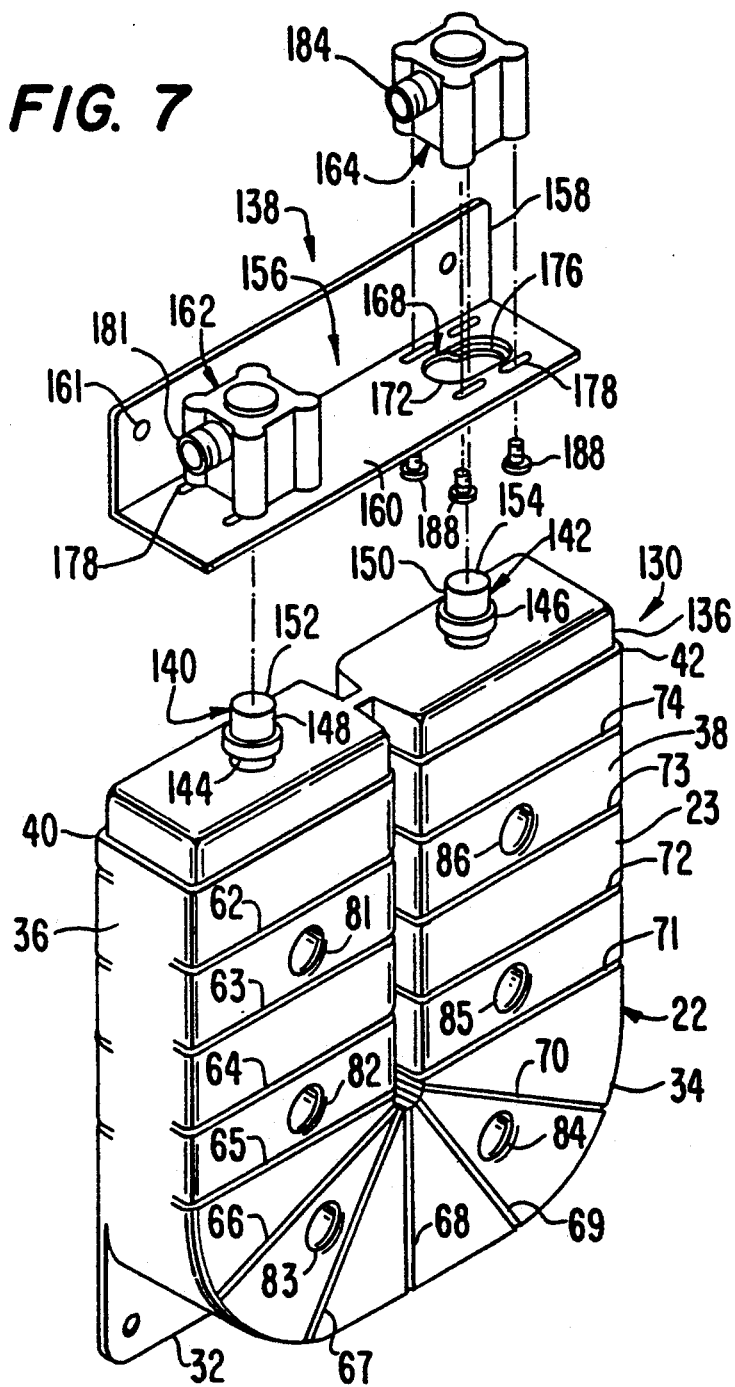

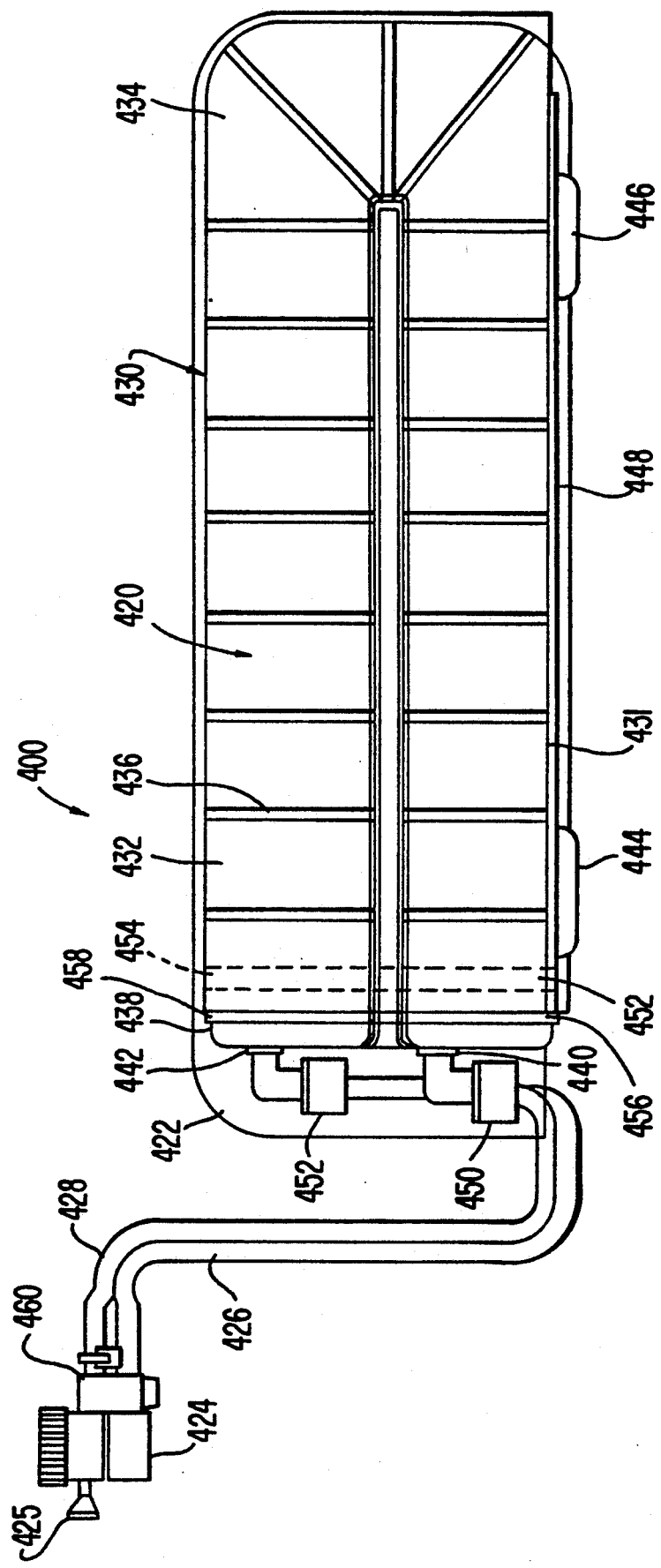

WATER PURIFICATION SYSTEM EMPLOYING MODULAR FLAT FILTER ASSEMBLY

BACKGROUND OF THE INVENTION

1. Field of the Invention

The present invention relates to water purification systems, and more particularly to domestic water purification systems employing modular filter assemblies utilizing granulated filtration media.

2. Discussion of the Related Art

Purification of drinking water prior to domestic use is becoming increasingly important to many consumers. Water is usually purified to one extent or another by most municipalities prior to being supplied to consumers. Such municipal purification systems are, however, often inadequate and, in any event, are incapable of removing many contaminants which adversely affect the taste of drinking water and which are introduced into drinking water between the municipal purification site and the residences being serviced by the municipality. For example, chlorine, chlorine by-products, rust, or even lead are often present in city and/or residential water pipes and may be picked up by water as it flows through the pipes. In addition, rural residences often have no means of purifying drinking water prior to use.

These factors have given rise to an ever increasing demand for on-site water purification systems. Filtration systems employing granulated media including activated charcoal and/or other filtration media have gained increased acceptance in many domestic applications because they remove many contaminants not removable by fibrous filters. Domestic drinking water purification systems have, however, heretofore suffered from several drawbacks and disadvantages limiting their acceptability to many consumers.

For instance, many water purification systems are unacceptably bulky and are unsuitable for residences having limited countertop or cabinet space. This problem can be alleviated somewhat by employing a relatively thin filter which can be installed in unused spaces such as the one which is ordinarily located behind the kitchen faucet. One such filter assembly is disclosed in U.S. Pat. No. 5,116,502, which issued to Ferguson on May 26, 1992. Ferguson discloses a filter having a housing which is sufficiently narrow to be installed behind a kitchen faucet and which is connectable to the kitchen faucet.

The filter assembly disclosed by Ferguson suffers several drawbacks. The filter assembly has inlets and outlets which are located relatively remote from one another on top of the filter housing, and is thus relatively bulky. The filter housing, though narrower than some other such housings, is still relatively wide and is unsuitable for mounting in many locations, such as inside an appliance such as a refrigerator or a freezer. Ferguson's filter assembly also is difficult to fabricate and employs a solid filter medium which is not as well suited for removing contaminants from drinking water as are many granulated filter media.

A filter employing a granulated filter medium is proposed by U.S. Pat. No. 4,693,823, which issued to Matchett on Sep. 15, 1987. The granulated filter medium is contained in an annular filter housing having inwardly-facing ridges formed in the side walls thereof. The ridges are said to create a turbulence along the surfaces of the inner walls of the housing so as to prevent the formation of channels which, according to the patent disclosure, would otherwise occur if water were to be permitted to flow laminarly through the housing.

The ridged housing of the filter assembly disclosed by Matchett exhibits several drawbacks. The ridges are formed from relatively sharp angles and would thus appear to weaken the sides of the housings. The thus weakened side walls of the housing could bow outwardly under fluid pressure within the housing, thereby promoting the very channeling which the filter is designed to prevent. The ridges on opposed sides of the housing are also aligned with one another and thus do not produce serpentine fluid flow through the housing, thus further increasing the pressures within the filter and increasing the dangers of channeling. The filter assembly disclosed by Matchett is also relatively bulky and lacks any devices facilitating its coupling to a dispenser or to a source of untreated water. This filter assembly is also insufficiently strong to withstand the pressure of water flowing through the filter, and thus must be enclosed in a separate housing.

OBJECTS AND SUMMARY OF THE INVENTION

It is therefore an object of the invention to provide a water purification system including a modular filter assembly which is sufficiently thin or flat so as to be installed in very narrow spaces which would otherwise be wasted.

It is another object of the invention to provide a water purification system which is sufficiently compact to be incorporated into appliances which dispense drinking water.

Still another object of the invention is to provide a filter assembly employing a granulated filter medium and capable of assuring adequate purification of drinking water flowing through the assembly by preventing the formation of channels along the side walls of the housing.

In accordance with one aspect of the invention, a drinking water purification system includes a support, a source of untreated water, a dispenser for purified water, and a filter assembly having an inlet port connected to the source of untreated water and an outlet port connected to the dispenser. The filter assembly preferably includes a U-shaped filter housing and an end cap. The filter housing has a base and first and second legs each extending from the base and terminating in a free end. Each of the legs has opposed side surfaces each of which has a plurality of transversely extending ribs formed therein which extend into the filter housing. The ribs on the opposed side surfaces of each leg are staggered with respect to one another such that each of at least some of the ribs on one of the side surfaces is disposed between adjacent ribs on the other of the side surfaces. The end cap is attached to and seals the free ends of the legs. The end cap has the inlet and outlet ports provided therein, the inlet and outlet ports cooperating with the first and second legs, respectively. A granulated filter medium is provided in the filter housing.

The support may comprise a door panel of a freezer, with the dispenser being provided in the door panel. Alternately, the support may comprises an inner surface of a counter disposed adjacent an outer surface of a sink basin. In this case, the filter assembly is positioned between the counter and the basin.

Another object of the invention is to provide a modular filter assembly which can quickly and easily be connected to and disconnected from a source of untreated water and a purified water dispensing device.

In accordance with this aspect of the invention, in addition to a filter assembly, a coupler is provided for connecting the filter assembly to the support. The coupler may include internal quick connect couplings which are provided in the inlet and outlet ports of the end cap and which admit untreated water into the filter assembly and discharge purified water from the filter assembly, respectively.

Alternatively, the coupler may comprises an external coupler including an L-shaped bracket having a first leg secured to the support and a second leg extending generally orthogonally from the first leg. Each of a pair of quick connect couplings is provided on the second leg of the bracket and is selectively connectable to one of the inlet and outlet ports of the filter assembly. The second leg of the bracket has a pair of receptacles formed therein, each of which comprises a hole having overlapping larger and smaller diameter portions. Each of the quick connect couplings comprises a housing having an internal chamber capable of receiving the reduced diameter portion of a nipple and a boss capable of engaging the shoulder of the nipple. Each housing is slidably connected to the second leg of the bracket so as to be movable from a position in which the reduced diameter portion and the shoulder of the respective nipple are freely insertable through the larger diameter portion of the respective receptacle to a position in which the reduced diameter portion is inserted through the smaller diameter portion of the respective receptacle and the shoulder is clamped between the second leg of the bracket and the boss. Each of the quick connect couplings further comprises a valve provided in the respective housing and openable upon the insertion of the respective nipple into the respective housing.

Still another object of the invention is to provide a process of manufacturing a filter assembly.

In accordance with this aspect of the invention, the process includes a first step of blow molding a U-shaped filter housing, the filter housing having a base and first and second legs each extending from the base and terminating in a free end, each of the legs having opposed side surfaces each having a plurality of transversely extending ribs formed therein which extend into the filter housing. The ribs on the opposed side surfaces of each blow-molded leg are staggered with respect to one another such that each of at least some of the ribs on one of the side surfaces is disposed between adjacent ribs on the other of the side surfaces. Subsequent steps include charging the housing with a granulated filter medium, and then sealing the free ends of the legs with an end cap, the end cap having inlet and outlet ports provided therein cooperating with the first and second legs. Preferably the step of molding the filter housing comprises blow molding the filter housing and the end cap as an integral unit, and a further step comprises removing the end cap from the housing prior to charging the housing.

Yet another object of the invention is to provide a process of purifying water in a flat filter assembly.

In accordance with this aspect of the invention, the process includes the steps of admitting untreated water into an inlet of a filter housing charged with a granulated filter medium, then purifying the water by forcing the water though the filter housing under pressure. The purifying step is carried out by diverting the water away from opposed sides of the filter in a generally serpentine manner as the water flows through the filter by forcing the water over ribs which extend inwardly from opposed sides of the filter housing and are staggered with respect to one another such that each of at least some of the ribs on one of the sides is disposed between adjacent ribs on the other of the sides. The ribs also reinforce the filter housing against water pressure therein. A final step includes discharging purified water from the filter housing.

Other objects, features, and advantages of the present invention will become apparent to those skilled in the art from the following detailed description. It should be understood, however, that the detailed description and its specific examples, while indicating preferred embodiments of the present invention, are given by way of illustration and not of limitation. Many changes and modifications from the scope of the present invention may be made without departing from the spirit thereof, and the invention includes all such modifications.

BRIEF DESCRIPTION OF THE DRAWINGS

The above and other objects of the invention will become more readily apparent as the invention is more clearly understood from the detailed description to follow, reference being made to the accompanying drawings in which like-reference numerals represent like-parts throughout, and in which:

FIG. 2 is an elevation view of the flat filter assembly and coupler of FIG. 1, viewed from a rear side of the assembly;

FIG. 3 is an elevation view of the flat filter assembly and coupler of FIG. 1, viewed from a front side of the assembly;

FIG. 4 is a sectional end view, taken along the lines 4—4 in FIG. 3;

FIG. 5 is an sectional elevation view, taken along the lines 5—5 in FIG. 3;

FIG. 6 is an enlarged view of the circled area in FIG. 5;

FIG. 7 is an exploded perspective view of a flat filter assembly and external coupler constructed in accordance with a second embodiment of the invention;

FIG. 15 is a side elevation view of a flat filter assembly constructed in accordance with a third embodiment of the present invention.

DETAILED DESCRIPTION OF THE PREFERRED EMBODIMENTS RESUME

Figure 1:
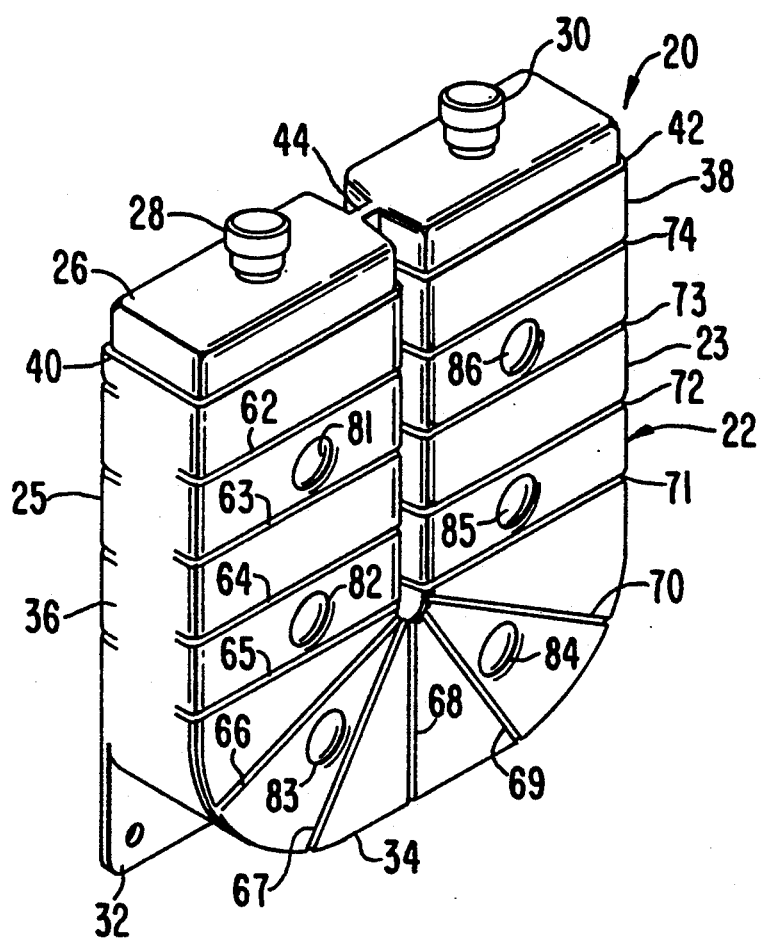
FIG. 1 is a perspective view of a modular flat filter assembly and coupler constructed in accordance with a first embodiment of the invention.
Figure 8:
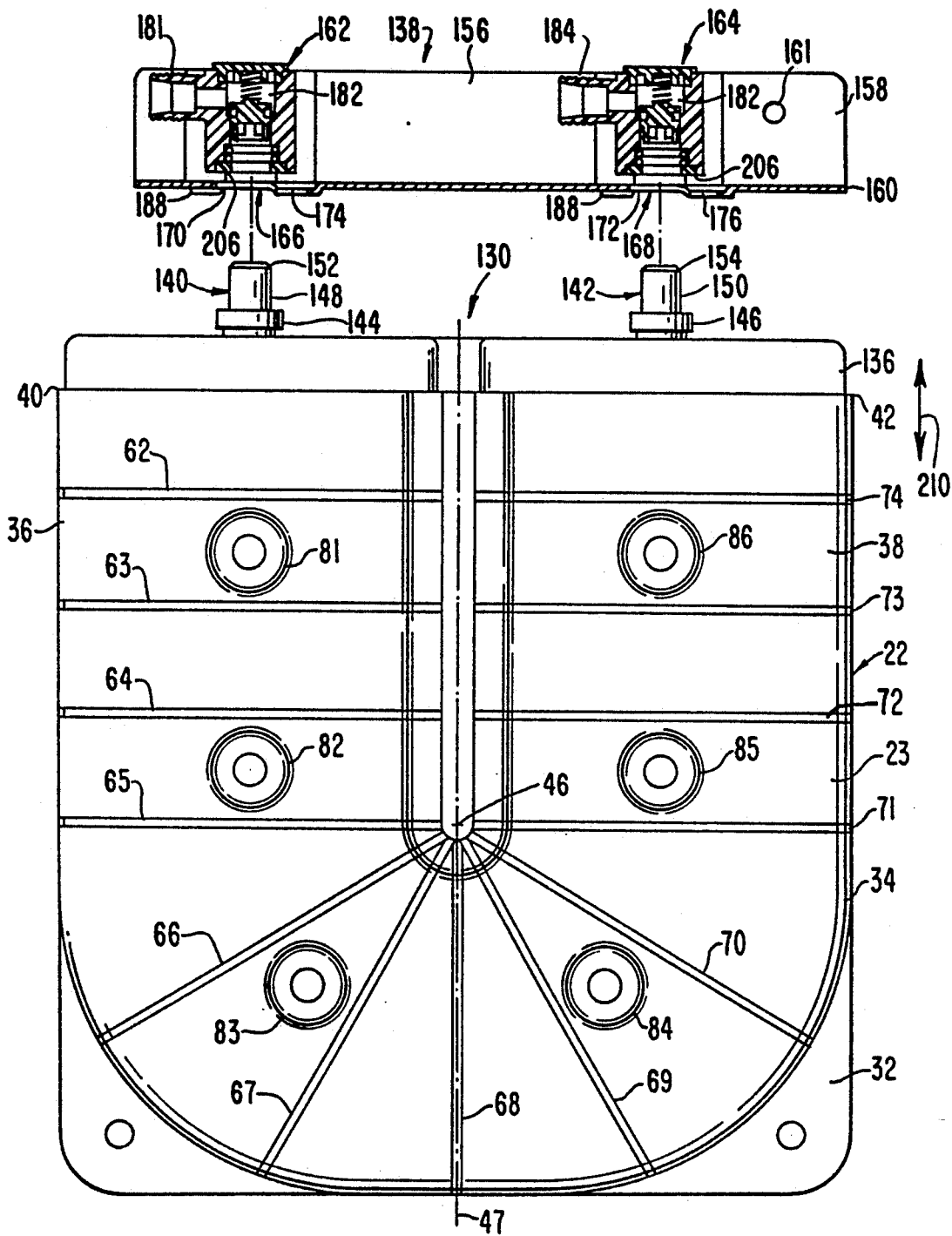
FIG. 8 is a side elevation view, illustrated partially in cross-section, of the assembly of FIG. 7 with the filter assembly being uncoupled from the coupler.
Figure 9:
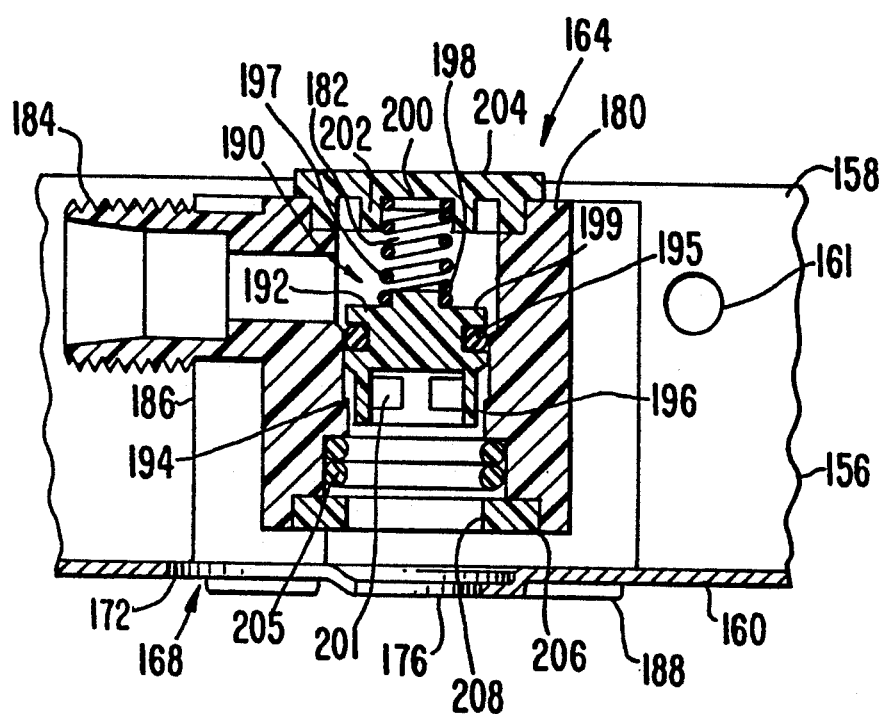
FIG. 9 is an enlarged view of a portion of the coupler illustrated in FIG. 8.

Pursuant to the invention, a drinking water purification system is provided which includes a flat filter assembly which may be installed in relatively narrow spaces which would otherwise be wasted such as the space beside a kitchen cabinet and the basin of a kitchen sink, inside a refrigerator, or on a countertop. The filter assembly includes a housing having a plurality of transversely extending ribs, formed in the opposed side walls of the housing, which reinforce the housing and which cause a generally serpentine flow of water through the housing during operation of the filter. Preferably, the housing is U-shaped and has a base and first and second legs extending from the base and terminating in free ends covered by an end cap provided with inlet and outlet ports. Protrusions preferably are formed in the housing in addition to the ribs to strengthen further the housing and to aid in preventing the formation of channels through the granulated filter medium contained within the housing. Internal or external quick connect couplers preferably connect the filter assembly to a source of untreated water and to a dispenser. An especially preferred external coupler includes an integral support element and devices for preventing water leakage when the filter assembly is disconnected from the coupler.

1. Water Purification System Including Flat Filter Assembly and Internal Quick Connect Coupler Referring now to FIGS. 1-6, a modular flat filter assembly 20 constructed in accordance with a first embodiment of the invention includes a filter housing 22 charged with a filter medium or media 24 and sealed with an end cap 26. Inlet and outlet ports 28 and 30 are provided on the end cap 26 and connect the filter assembly 20 to a source of untreated drinking water and to a purified water dispenser which may be capable of dispensing water directly into a drinking glass or the like or, alternatively, which may dispense water into a holding tank. A mounting flange 32 is provided on the housing 22 for mounting the filter housing 22 to a suitable support surface.

Filter housing 22 is preferably U-shaped and includes a base 34 and first and second legs 36 and 38, each extending from the base and terminating in a respective free end 40, 42. The base 34 and first and second legs 36 and 38 preferably comprise a single blow molded element composed of, e.g., Fiberglass reinforced polypropylene. Blow molded materials are preferred because they are relatively inexpensive to produce and to mold and contain no solvents. If desired, the first and second legs 36 and 38 can be joined by an integral strut 44 extending longitudinally between and connecting the first and second legs 36 and 38. The housing 22 is preferably very thin—on the order of 1" to 1¼"—so as to be installable in very tight spaces which would otherwise be wasted.

To facilitate the use of a flat filter assembly, devices are provided on the filter housing 22 to assure that water flowing through the filter assembly is directed through the granulated filtration medium 24 as opposed to along the walls of the filter housing 22. The devices also structurally reinforce the filter housing 22, thereby preventing the sides of the housing from bowing outwardly and away from the filtration medium 24 in use, thus preventing further the formation of channels along the edge of the housing.

The reinforcing devices are preferably formed during molding of the housing 22 and include a plurality of ribs 48-74 and a plurality of generally cylindrical protrusions 75-86 formed in the opposed front and rear side walls 23 and 25 of the housing and extending into the housing 22. The protrusions provide a degree of reinforcement which could not be achieved by the ribs alone unless they were undesirably large.

The ribs extend generally transversely to the direction in which water flows through the housing. Accordingly, the ribs on the legs 36 and 38 extend generally orthogonally to the longitudinal axes of the legs and thus to a line 47 which bisects the base 34 and about which the legs 36 and 38 are symmetric. Each rib is formed from an inwardly protruding indentation in the housing 22, extends substantially the entire width of the wall in which it is formed, and is dimensioned so as to provide maximum reinforcement of the filter housing 22 without significantly weakening the housing 22 in the vicinity of the ribs. To this end, each rib has a generally rectangular cross section with each of its corners rounded so as to maximize strength. As clearly illustrated in the drawings, each rib extends into the housing by a relatively small distance of less than 1/4 the diameter of the housing. These ribs thus avoid "dead spots" in the housing and permit substantially unobstructed flow.

The ribs 48-74 are preferably designed to not only prevent the channeling of water as it flows through the housing 22 but also to direct the water to flow through the housing 22 in a generally serpentine manner so as to produce maximum filtration while at the same time permitting generally unobstructed flow through the filter. To this end, the ribs on the opposed front and rear side surfaces of each of the legs 36 and 38 and of the base 34 of the housing 22 are offset or staggered with respect to those on the opposite side surface. The ribs 62-64 and 72-74 on the front side of each of the first and second legs 36 and 38 thus are disposed approximately halfway between adjacent ones of the ribs 48-51 and 58-61 on the rear side of each of the legs.

The ribs 65-71 and 52-57 on the opposed front and rear side surfaces of the base 34 extend radially from a center point 51 of bisecting line 47 and are spaced by a uniform angular spacing. The desired staggering effect is achieved by rotating the angles at which the ribs on the rear side extend with respect to the angles at which those on the front side extend by half of the angular spacing between the ribs. More specifically, a first rib 68 on the front side of base 34 extends co-linearly with bisecting line 47, and the remaining ribs 67, 69, 66, 70, and 65, 71 are spaced at increments of 30°. Thus, ribs 67 and 69 extend at angles of 30° from bisecting line 47, ribs 66 and 70 extend at 60°, and ribs 65 and 71 extend at 90°. Because the ribs 52-57 on the rear of base 34 are rotated by 15° with respect to the ribs 65-71, ribs 54 and 55 extend at angles of 15° from bisecting line 47, ribs 53 and 56 extend at 45°, and ribs 52 and 57 extend at an angle of 75°.

Protrusions 75-80, formed in the rear side of filter housing 22, and protrusions 81-86, formed in the front side of the housing 22, are aligned with one another and extend approximately half-way through the housing 22. The side walls of the aligned protrusions extend completely through the housing and thus prevent the housing from bowing out under water pressure within the housing. Further reinforcement is provided by thin lips 87 of material which are formed between each pair of aligned protrusions. If desired, some or all of these lips could be eliminated altogether so that bores are formed through the housing 22 for receiving mounting bolts or the like. Each protrusion is formed in the center of the housing portion in which it is formed so as to provide maximum reinforcement and flow distribution.

Housing 22 is charged, that is, filled or partially filled, with filter medium 24 prior to connection of the end cap 26 to the remainder of the housing. Filter medium 24 may comprise activated charcoal and/or any other suitable granulated filtration materials. The use of a U-shaped housing facilitates the charging of each half of the housing with a different filtration media. For instance, two different grades of granular activated charcoal could be provided in the left and right halves of the housing 22, the first one of which removes relatively large contaminants, and the second one of which removes relatively small contaminants.

Media may also be interspaced with the filtration medium or media to add materials to the water. For example, phosphate crystals could be provided to add calcium to the water, or granules could be added which flavor the water with, e.g, a lemon or lime flavor.

Porous filters 90, 92 are disposed in the free ends 40 and 42 of legs 36 and 38 proximate end cap 26. Filters 90 and 92 are preferably made from felt and held in place by spring clips such as clip 94 illustrated in FIG. 6. These filters remove particulates prior to and after chemical or ionic treatment by the granulated filtration medium 24 by trapping particulates in interstices formed between the fibers forming the filters. Preferably, filter 90 is somewhat coarser than filter 92 so that relatively large particles are removed in the first filter 90 and the smaller remaining particles are removed in the second filter 92.

Clip 94 preferably provides sufficient biasing forces to assure that the media 24 is compacted. To this end, clip 94 has upwardly-bent ends 96 which engage shoulders 98 formed in the free ends 40 and 42 of legs 36 and 38 and which securely hold the clip in position.

Each of the inlet and outlet ports 28 and 30 is identical in construction. Accordingly, only outlet port 30 will be described. Referring to FIG. 6, outlet port 30 includes a stepped nipple 100 formed integral with end cap 26. A conventional internal coupler 102 is provided inside stepped nipple 100, and includes O-rings 104 and a quick connect coupling 106. Quick connect coupling 106 includes a female portion 108 press fit or otherwise secured within nipple 100 and a male portion 110 which receives the nipple of a suitable supply hose (not shown). As is known in the art, a segmented annular collar 112 of male portion 110 of coupling 106 bows outwardly, upon insertion of the supply hose, into engagement with an annular shoulder 114 of female portion 108 to provide a secure connection. The hose is sealed to the nipple 100 by O-rings 104.

Filter assembly 20 is constructed in the following manner. First, end cap 26 and filter housing 22, including base 34 and legs 36 and 38, are blow molded as an integral unit. Molding end cap 26 and housing 22 as an integral unit assures that the mating portions of these devices will have exactly or nearly exactly the same shape. End cap 26 is then cut off from housing 22 to expose the interior of housing 22. Then, the filter housing 22 is charged with activated charcoal and/or other filtration media 24 which remove impurities from water mechanically or under chemical or ionic reactions. Felt filters 90 and 92 are then positioned and held in place by retaining clips 94 which are pressed into the housing by a device such as an arbor press. End cap 26 is then reattached to housing 22. Preferably, end cap 26 is heat bonded to housing 22, thus providing a fluid-tight connection capable of withstanding relatively high pressures without using solvents which could otherwise be introduced into the water being filtered. Quick connect couplings 106 are inserted in the nipples 100 of inlet and outlet ports 28 and 30 either before or after connection of the end cap 26 to the housing 22.

The filter assembly of FIGS. 1-6 operates as follows. First, the housing 22 is secured to a suitable support by bolting or otherwise affixing flange 32 to the support. The inlet and outlet ports 26 and 28 are then connected to suitable inlet and outlet hoses. Untreated water is supplied to the inlet 28 and conveyed under pressure through the end cap 26 and into the first leg 36 of housing 22, where relatively large particles ar removed by felt filter 90. The water is then forced through first leg 36, base 34, and second leg 38 in contact with the filtration media 24, and is purified. The thus purified water then flows through the second felt filter 92, where the remaining relatively small particles are removed, and is then discharged from outlet port 30 to a suitable dispensing device. Water flowing through the filter housing 22 is directed in a generally serpentine manner through the housing by ribs 48-74 and protrusions 75-86, thus assuring prolonged contact with filtration media and thus maximum treatment. The ribs 48-74 and protrusions 75-86 also prevent the housing from bowing outwardly under the fluid pressure within the housing, thus further preventing channeling.

2. Water Purification System Including Flat Filter Assembly and External Quick Connect Coupler A water purification system according to the present invention could also incorporate an external coupler as opposed to internal couplers. Such a coupler would further facilitate coupling of the filter assembly to the remainder of the purification system and could simultaneously serve as a support for the filter assembly.

Referring to FIGS. 7-11, a water purification system according to this embodiment of the invention includes a modular flat filter assembly 130 having a filter housing 22 which is identical to that of the first embodiment of the invention and which thus has a plurality of staggered ribs, e.g., 62-74, and a plurality of protrusions 81-86 provided on the front sides of first and second legs 36 and 38 and of base 34. Other ribs and protrusions (not shown in FIGS. 7-11) are formed in the rear side of the housing 22. Filter assembly 130 of this embodiment of the invention differs from that of the previous embodiment primarily in that it employs a different end cap 136 and cooperates with a different quick connect coupler 138.

End cap 136, though otherwise identical to end cap 26 of the first embodiment, utilizes as inlet and outlet ports distinctive nipples 140 and 142 each having a shoulder 144, 146 located adjacent end cap 136 and a reduced diameter portion 148, 150 extending axially outwardly from the end cap 136. Reduced diameter portions 148 and 150 have beveled free ends 152, 154 for cooperation with internal valves of the quick connect coupler 138.

Coupler 138 includes an L-shaped bracket 156 having a first, vertical leg 158 and a second, horizontal leg 160. Vertical leg 158 has openings 161 formed therein for attachment to a support. Horizontal leg 160 slidably receives inlet and outlet quick connect couplings 162 and 164. More specifically, quick connect couplings 162 and 164 mate with receptacles 166 and 168 formed in horizontal leg 160 of bracket 156. Coupling 162 has an inlet port 181 communicating with a source of untreated water, and coupling 164 has an outlet port 184 connected to a purified water dispenser. Each receptacle 166, 168 comprises a hole having overlapping larger and smaller diameter portions 170, 174 and 172, 176. Smaller diameter portions 174, 176 are preferably recessed with respect to larger diameter portion 170, 172 so as to form seats for shoulders 144, 146 of nipples 140, 142. These recesses thus act as latches preventing unintended movement of filter assembly 130 relative to coupler 138. Slots 178 are formed symmetrically about the receptacles 166, 168 for slidably receiving quick connect couplings 162, 164.

Each of the quick connect couplings 162, 164 is identical in construction. Accordingly, only coupling 164 will be described with reference to FIG. 9. Coupling 164 includes a housing 180 having an internal chamber 182 formed therein which is capable of receiving the reduced diameter portion 150 of nipple 142 an which communicates with outlet port 184. Internally threaded chambers 186 are symmetrically disposed about the corners of housing 180 and threadedly receive bolts or screws 188 which extend through the slots 178 and which engage the bottom surface of horizontal leg 160. Quick connect coupling 164 further includes O-rings 205 and an annular boss 206. The inner periphery of boss 206 defines a female port 208 for admitting the reduced diameter portion 150 of nipple 142 into chamber 182.

Quick connect coupling 164 preferably further includes an internal valve 190 which prevents water leakage upon removal of the filter assembly 130 from the coupler 138. In the illustrated embodiment, this valve 190 is a poppet valve which includes a stepped piston 192 sealingly guided in a cylinder 194 of housing 180 by O-rings 195. Piston 192 includes a perforated annular flange 196, the diameter of which generally matches that of the reduced diameter portion 150 of nipple 142. Piston 192 is movable against the force of a spring 197 under contact with reduced diameter portion 150 of nipple 142 from the closed position illustrated in FIGS. 7-9 to a fully open position illustrated in FIGS. 10 and 11 in which a head 198 of piston 192 is received in a corresponding recess 200 defined by an annular flange 202 of an end cap 204 of housing 180, and in which shoulders 199 of piston 192 abut flange 202. End cap 204 is preferably attached to the housing 180 by ultrasonic welding or by some other connection technique which does not use solvents. Spring 197 is anchored in position at its upper end by flange 202 and a its lower end by head 198 of piston 192.

The interaction of the bracket 156 and the couplings 162 and 164 renders the coupler 138 ideally suited for the provision of gallon meters, pressure regulators, or flow monitors. Such devices could be placed on the bracket 156 upstream of inlet port 181.

The coupler 138 and the filter assembly 130 operate as follows. Prior to coupling, the quick connect couplings 162 and 164 assume the position illustrated in FIG. 8, in which their respective nipple communication ports 208 are generally aligned with the centers of the larger diameter portions 170 and 172 of receptacles 166 and 168. Then, the filter assembly 130 is lifted upwardly in the direction of arrow 210 in FIG. 8 such that the reduced diameter portions 148 and 150 of nipples 140 and 142 are fully inserted through ports 208 and into the internal chambers 182 of the housings 180 of the quick connect couplings 162, 164, thus opening poppet valves 190. At this time, nipples 140, 142 are sealed to the housings 180 by the O-rings 205. Upward movement of nipples 140 and 142 is limited by the engagement of shoulders 144 and 146 with respective bosses 206.

Figure 10:
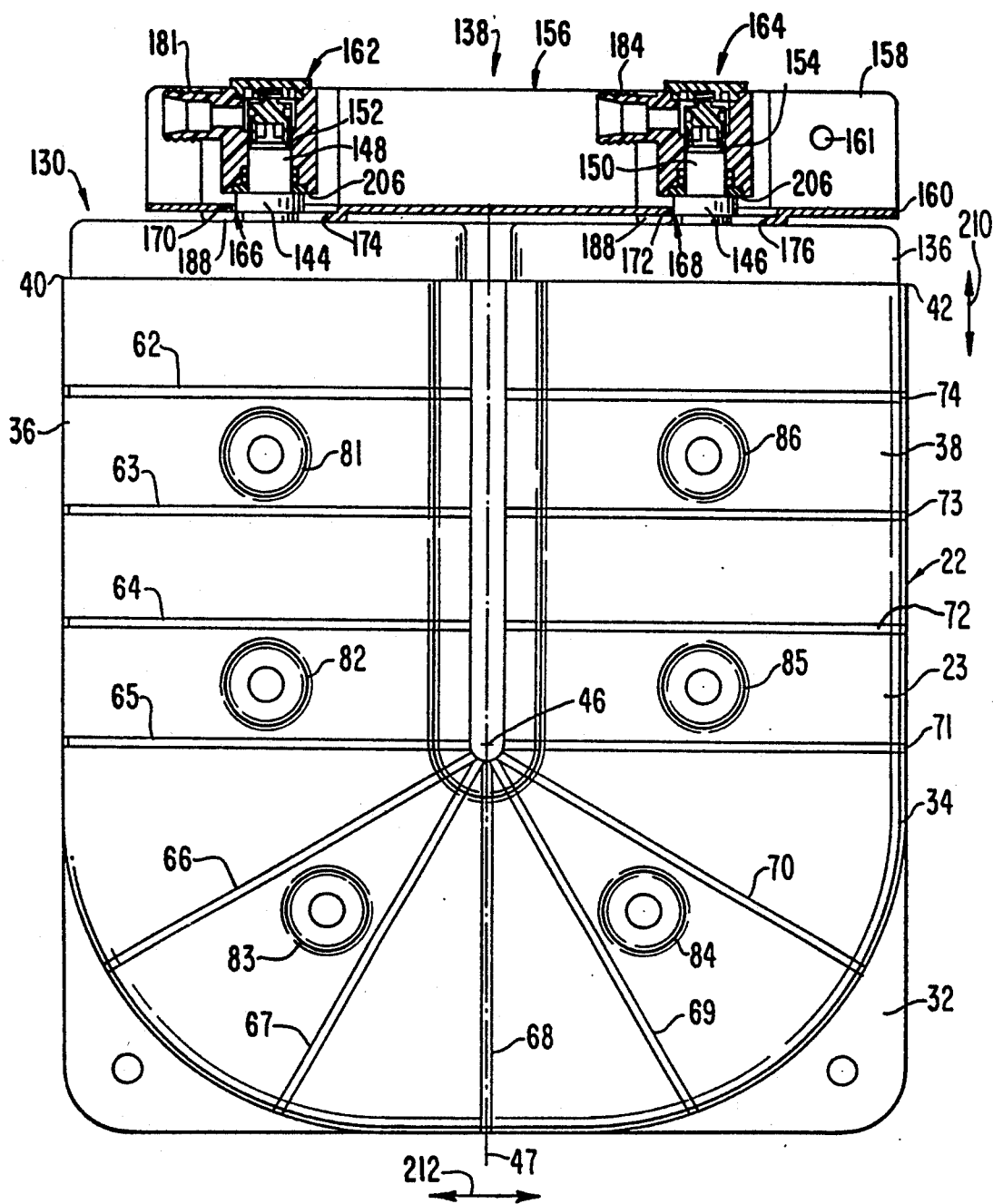
FIG. 10 is a side elevation view, illustrated partially in cross-section, of the assembly of FIG. 7 with the filter assembly being inserted into the mounting bracket but not yet locked in place.
Figure 11:
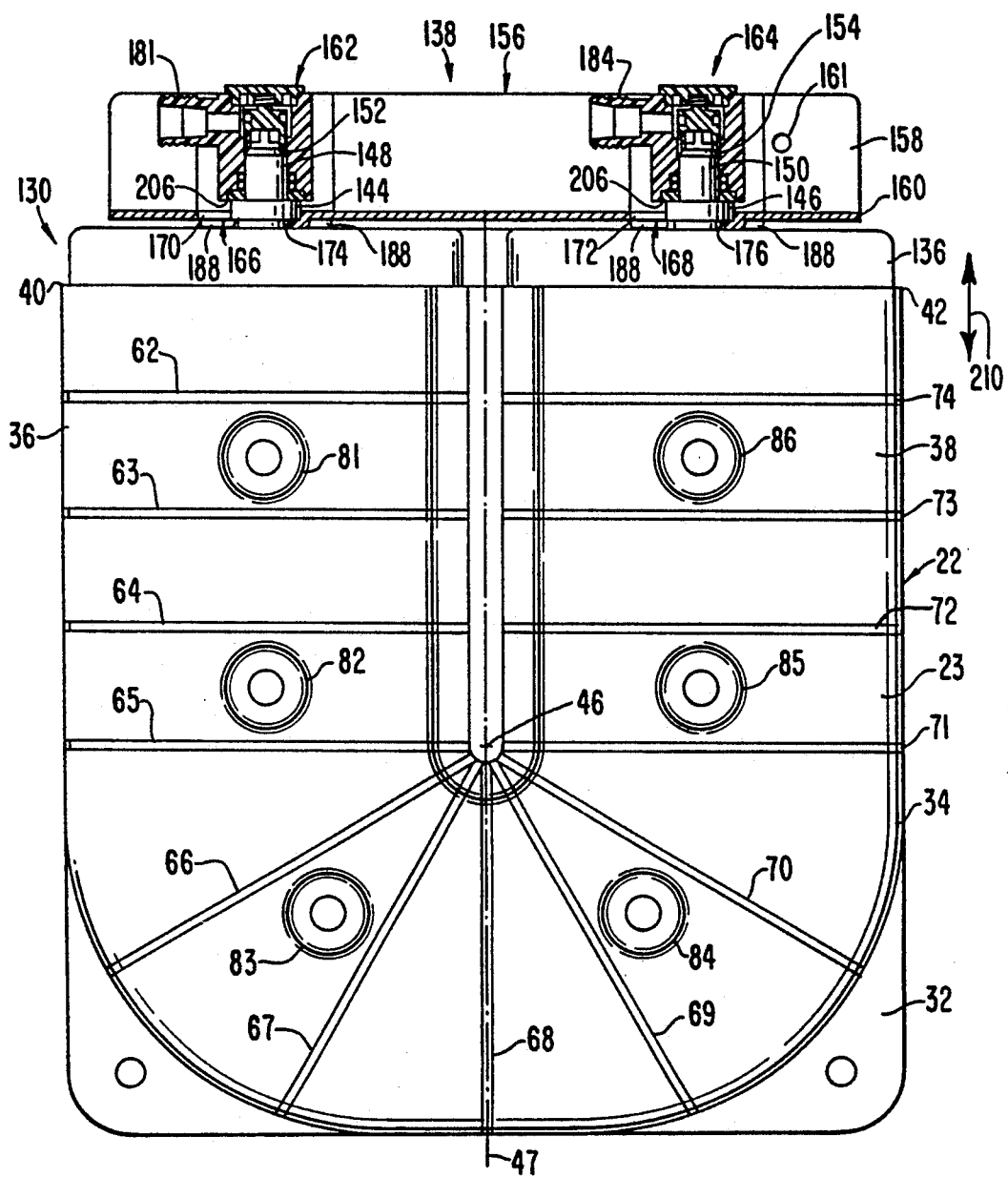
FIG. 11 is a side elevation view, illustrated partially in cross-section, of the flat filter assembly of FIG. 7 with the filter housing being inserted into the mounting bracket and locked in place.

Next, the filter housing 130 is moved rightwardly or in the direction of arrow 212 in FIG. 10 to the position illustrated in FIG. 11 in which the couplings 162 and 164 are slid to a position in which the reduced diameter portions 148 and 150 of nipples 140 and 142 are received in the recessed smaller diameter portions 174 and 176 of receptacles 166 and 168 and in which the shoulders 144 and 146 of nipples 140, 142 are clamped between the bosses 206 and the upper surface of the horizontal leg 160 of L-bracket 156. During this motion, the shoulders 144, 146 of nipples 140, 142 drop down into the seats formed by recessed portions 174, 176, thus preventing the filter assembly 130 from sliding to the left unless it is lifted out of the recesses.

The filter assembly 130 is now ready for operation. Accordingly, upon opening of an inlet valve (not shown), untreated water flows through inlet port 181 of quick connect coupling 162, into chamber 186, through the space 194 formed between the internal wall of the cylinder 192 and the flange 196, through the apertures 201 of the flange 196, and into the inner bore of nipple 140. Flow into the nipple 140 from the apertures 201 is facilitated by the beveled surface 152 of nipple 140. Water then flows under pressure through the filter housing 22 and is purified as discussed above in connection with the first embodiment, and then flows out of the outlet nipple 142 before being discharged from discharge port 184 of quick connect coupling 164.

Filter assembly 130 can be uncoupled from coupler 138 simply by lifting the filter assembly so that shoulders 144 and 146 of nipples 140, 142 disengage the recesses surrounding the smaller diameter portions 174, 176 of receptacles 166, 168 and by sliding filter assembly 130 to the left in the direction of arrow 212 in FIGS. 10 and 11. The filter assembly 130 can then be lowered in the direction of arrow 210 to decouple the filter assembly 130 from the coupler 138 under the biasing forces of springs 197. Valves 190 close upon removal of filter assembly 130 from coupler 138 under the biasing force of springs 197, thus preventing the leakage of fluid from either the untreated water inlet port 182 or the purified water outlet port 184 of the filtration system.

3. Applications of Water Purification Systems Incorporating Flat Filter Assemblies Because the filter assemblies illustrated in FIGS. 1-11 are relatively flat and have inlet and outlet connections positioned relatively close to one another, they are well suited for installation in spaces which would otherwise be wasted because the provision of filters in such spaces was heretofore considered impractical.

a. Under the Counter Application

Figure 12:
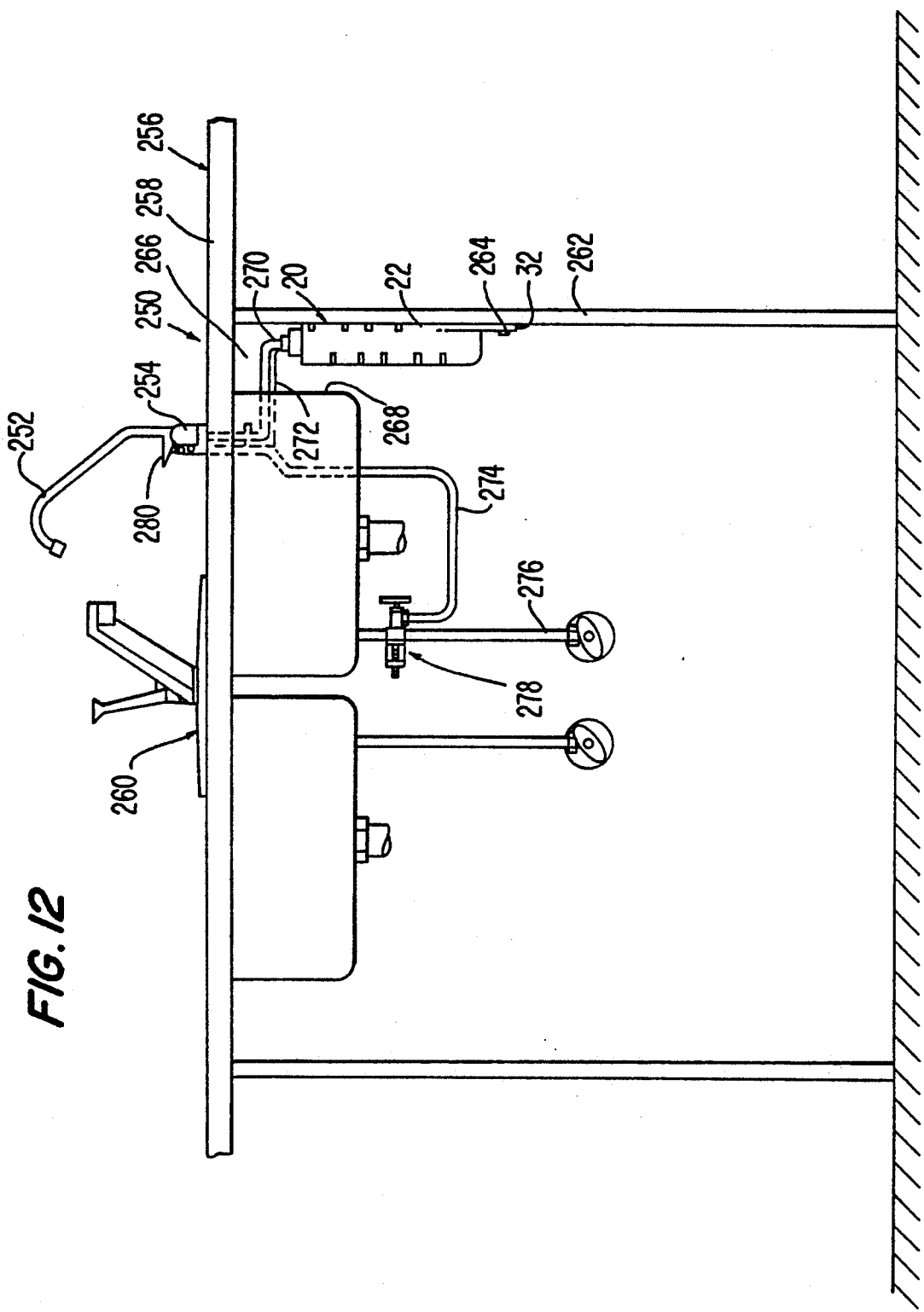
FIG. 12 schematically illustrates an under-the-counter water purification system constructed in accordance with the present invention.

One such application, illustrated in FIG. 12, comprises a drinking water purification system 250 including a modular flat filter assembly 20 of the type illustrated in FIGS. 1–6, a dispenser 252, and a valve assembly 254 selectively permitting and preventing the flow of water through filter assembly 20.

Filter assembly 20 is mounted within a kitchen cabinet 256 having a countertop 258 on which is mounted a conventional kitchen sink 260. Filter assembly 20 is mounted on a side wall 262 of cabinet 256 by bolts 264 connecting the flange 32 of filter housing 22 to the wall 262. Filter assembly 20, being relatively flat, can be positioned in a relatively narrow space 266 formed between the wall 262 of cabinet 256 and a basin 268 of sink 260. Inlet and outlet hoses 270 and 272 connect the respective inlet and outlet ports of filter assembly 20 to valve assembly 254.

Valve assembly 254 is conventional and preferably includes first, second, and third ports. The first port is always pressurized and is connected to a line 274 which is in turn connected to a cold water supply pipe 276 by a conventional self-piercing saddle valve 278. The second and third ports are connected to inlet and outlet hoses 270 and 272, respectively, and are normally closed by valves (not shown) which are opened upon actuation of a handle 280 of valve assembly 254 so as to permit the flow of water from line 274, through the first and second ports of valve assembly 254, and into inlet hose 270. Water in hose 270 flows through filter assembly 20, hose 272, the third port of valve 254, and then out of a faucet serving as dispenser 252.

Although the water purification system 250 as illustrated employs a filter assembly 20 having the internal quick connect couplings of FIGS. 1–6, the filter assembly 130 and the associated external quick connect coupler 138 of FIGS. 7–11 could also be used.

b. Refrigerator/Freezer Application

Figure 13:
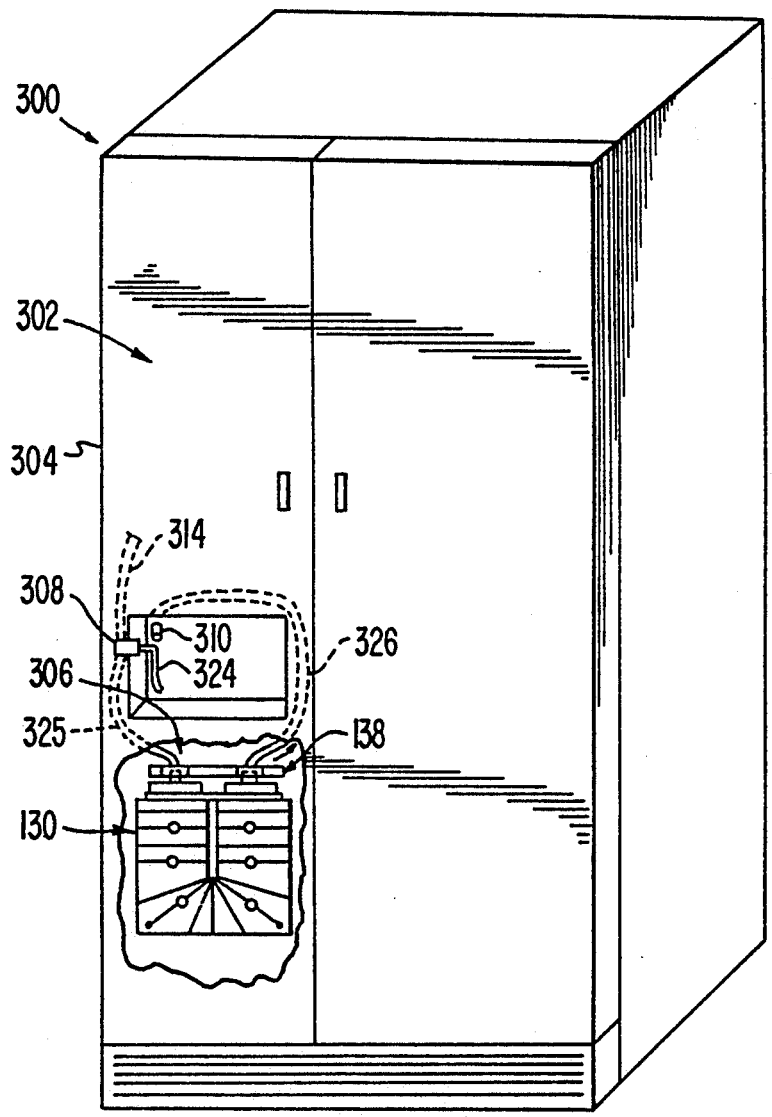
FIG. 13 schematically illustrates a front view of a water purification system, constructed in accordance with the present invention, which is mounted inside a freezer door.
Figure 14:
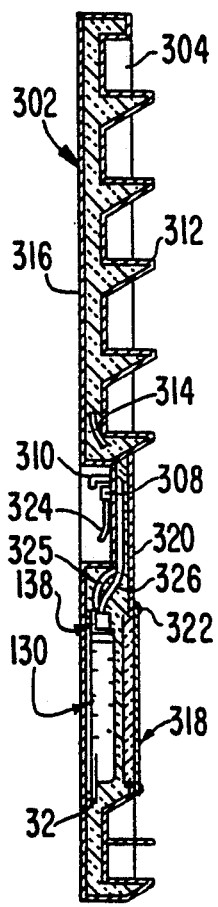
FIG. 14 is a sectional side elevation view of the system of FIG. 13.

A modular flat filter assembly constructed in accordance with the present invention could also be provided inside a refrigeration device, and preferably inside an insulated panel of such a device. Referring now to FIGS. 13 and 14, a water purification system 306 constructed in accordance with the present invention is provided inside the insulated door 304 of a freezer 302 of a refrigerator/freezer 300.

In the illustrated embodiment, the water purification system 306 includes a filter assembly 130 and coupler 138 constructed in accordance with the embodiment of the invention illustrated in FIGS. 7–11. Refrigerator/freezer 300 is fitted with a conventional cold water dispensing system including a manually activated valve 308 and a spigot 310.

As is conventional in the art, valve 308 and spigot 310 are disposed within door 304 of freezer 302 beneath shelves 312 and are connected to a source of water by a line 314. However, rather than permitting untreated water to flow directly from line 314 to spigot 310 upon actuation of valve 308, the water purification system of the present invention purifies the water in filter assembly 130 prior to discharge from spigot 310. Accordingly, the inlet port of filter assembly 130 is connected via a line 325 to valve 308, and the outlet port is connected via a line 326 to spigot 310. Lines 314, 325, and 326 and filter assembly 130 are preferably positioned sufficiently close to an inner wall 320 of freezer door 304 so as to be cooled without freezing. Filter assembly 130 can thus serve as a cold water reservoir as well as a filter.

The vertical leg of the L-bracket of coupler 138 is bolted or otherwise secured to an outer wall 316 of freezer door 304. If desired, the flange 32 of filter housing 22 can also be connected to outer wall 316 of door 304. Access to the filter assembly 130 is made possible by a removable access panel 318 which is secured to inner wall 320 of freezer door 304 by suitable connectors 322 and which is formed from an insulative material such as vacuum formed polystyrene.

In use, filter assembly 130 is installed by removing access panel 318 and by coupling the filter assembly to the coupler 138 in the manner discussed above and illustrated in FIGS. 7–11. Panel 318 is then replaced. Upon actuation of valve 308, e.g., by pressing a glass against a lever 324, water flows under pressure through line 314, valve 308, and line 325, and through the filter assembly 130 where it is purified. The water is also cooled in lines 314, 325, and filter assembly 130. The thus purified cold water then flows out of the outlet port of filter assembly 130, through line 326, and out of spigot 310.

The modular flat filter assembly of the present invention thus can be provided inside a refrigerator or freezer without significantly interfering with existing storage or shelf space. It should be noted that the filter assembly need not be disposed within the freezer door as illustrated, but could be retrofitted into the interior of the refrigerator in an inconspicuous location such as below a shelf. This latter arrangement would not require modification of the refrigerator by the refrigerator manufacturer.

Although not illustrated in the drawings, a device such as a gallon meter could be provided in the water purification system 306, preferably in line 325 upstream of filter assembly 130, to monitor the flow of water through the filter assembly 130 and to disable the filter assembly after a predetermined amount of water has been treated by the water purification system. A pressure regulator could also be provided, if desired.

A water purification system employing a modular flat filter assembly constructed in accordance with the present invention could be provided in many locations other than those illustrated and described above. For instance, such a filter assembly could be provided in commercial coffee makers, drinking fountains, water coolers, etc.

4. Countertop Application of Water Purification System Incorporating Flat Filter Assembly The flat filter assemblies described up to this point have been designed so that one of their flat faces can be suspended from and/or mounted to a support surface. However, flat filter assemblies constructed in accordance with the present invention could also be supported directly on a countertop or any other horizontal flat surface and would be well-suited for such applications because they would minimize consumption of counter space. Referring to FIG. 15, one such water purification system 400 includes a modular flat filter assembly 420 covered by a cover 422 and connected to a valve 424 by hoses 426 and 428.

Filter assembly 420 is similar to that discussed above in connection with the preceding embodiments and includes a housing 430 having first and second legs 431 and 432 formed integral with a base 434. Transversely extending ribs 436 are formed in front and rear faces of the housing 430 and are staggered with respect to one another in the same manner as the ribs discussed in connection with the preceding embodiments. Protrusions (not shown) could also be provided to afford the same benefits of the protrusions of the previous embodiments. An end cap 438 is heat plate bonded or otherwise connected to housing 430 and has inlet and outlet ports 440 and 442 formed therein. As in the previous embodiments, porous filters 452 and 454 are held in the free ends 456 and 458 of legs 431 and 432 by spring clips.

Housing 430 differs from the housings of the previous embodiments primarily in that the mounting flange has been deleted and feet 444, 446 added for supporting the filter assembly 420 on a countertop or on any other flat surface. To render the assembly 420 as inconspicuous as possible and to minimize the possibility of the housing 430 being overturned when it is inadvertently bumped, the housing of this embodiment is somewhat shorter in the vertical direction but longer in the horizontal direction when compared to that of the previous embodiments so as not be as noticeable or as top heavy. The housing 430 also has flanges 448 provided on the opposed lower surfaces of leg 431 and base 434 for supporting cover 422, which may or may not be transparent as illustrated.

Valve 424 is conventional and connects the water purification system 400 to a kitchen faucet. This valve may serve as a quick connect coupler which may be easily attached to and detached from a kitchen faucet. However, in the preferred embodiment illustrated in FIG. 15, valve 424 comprises a diverter valve which is screwed onto or otherwise secured to the spigot of a kitchen faucet. Valve 424 includes a pin 425 which, when inserted into the valve, causes the water flowing into the valve to bypass lines 426 and 428 and to flow out of a spigot 460. When pin 426 is withdrawn, water flows through line 426, filter housing 420, and line 428 before being discharged from spigot 460. This valving arrangement eliminates the need for providing quick connect couplings directly on the filter assembly. Accordingly, the inlet and outlet ports 440 and 442 of the filter assembly 420 are connected to hoses 426 and 428 via standard fittings 450 and 452.

The construction and operation of filter assembly 420 is otherwise identical to that of the previous embodiments and thus will not be discussed in more detail.

Many changes and modifications could be made to the water purification systems and the associated filter assemblies of the present invention without departing from the spirit and scope of the present invention. For examples, flat filter assemblies constructed in accordance with the present invention could be mounted in the space formed between the kitchen wall and the rear of the kitchen cabinet, or virtually any other narrow space located proximate a source of untreated water and a dispenser for purified water. In addition, flow regulation and control devices could be utilized with any application of any of the disclosed water purification systems. Water meters could also be provided to monitor the flow of water through the assembly. Other changes and modifications encompassed by the invention will become apparent from a reading of the appended claims.

We claim:

1. A drinking water purification system comprising:
   (A) a support;
   (B) a source of untreated water;
   (C) a dispenser for purified water; and
   (D) a filter assembly which is mounted on said support and which has an inlet port connected to said source of untreated water and an outlet port connected to said dispenser, said filter assembly including a relatively flat molded filter housing which is charged with a granulated filtration medium, which has said inlet and outlet ports provided thereon, and which has devices formed in opposed side surfaces thereof which define means for reinforcing said filter housing while preventing the formation of channels in said filtration medium, said devices including a plurality of transversely extending ribs each formed from an indention in said housing and extending into said housing by a distance of less than 1/4 the diameter of said housing.

2. A system according to claim 1, wherein each of said ribs has a generally rectangular cross-section and is rounded at the corners.

3. A system according to claim 1, further comprising
   a coupler including quick connect couplings which are provided in said inlet and outlet ports and which admit untreated water into said filter assembly and discharge purified water from said filter assembly, respectively, and
   a mounting flange provided on said filter housing for securing said filter housing to said support.

4. A system according to claim 1, wherein said support comprises a door panel of a freezer, and wherein said dispenser is provided in said door panel.

5. A system according to claim 1, wherein
   said support comprises an inner surface of a counter disposed adjacent an outer surface of a sink basin,
   said filter assembly is positioned between said counter and said basin, and wherein
   said dispenser comprises a faucet.

6. A system according to claim 1, wherein
   said filter housing is generally U-shaped and has a base and first and second legs each extending from said base and terminating in a free end,
   a plurality of transversely said ribs are formed on the opposed side surfaces of each leg and are staggered with respect to one another such that each of at least some of the ribs on one of said side surfaces is disposed between adjacent ribs on the other of said side surface, and wherein
   an end cap is attached to and seals said free ends of said legs, said end cap having said inlet and outlet ports provided therein, said inlet and outlet ports cooperating with said first and second legs, respectively.

7. A system according to claim 6, wherein a plurality of said ribs are formed in the opposed side surfaces of said base, the ribs on the opposed side surfaces of said base being staggered with respect to one another such that each of at least some of the ribs on one of said side surfaces of said base is disposed between adjacent ribs on the other of said side surfaces of said base.

8. A system according to claim 7, wherein
   said legs are symmetric about a bisecting line which bisects said base,
   one of the ribs on one of said opposed side surfaces of said base extends generally collinear to said bisecting line,
   other ribs on said one side surface of said base extend at angles of approximately 30°, 60°, and 90° from said bisecting line, and wherein
   ribs on said other side surface of said base extend at angles of about 15°, 45°, and 75° from said bisecting line.

9. A system according to claim 6, further comprising first and second porous filters, each of which is disposed in the free end of a respective one of said legs proximate said end cap, and first and second retaining clips, each of which abuts an interior shoulder of the free end of the respective leg and supports a respective one of said porous filters.

10. A system according to claim 9, wherein said first porous filter communicates with said inlet port and said second porous filter communicates with said outlet port, and wherein said first porous filter is coarser than said second porous filter.

11. A system according to claim 1, further comprising a coupler for connecting said filter assembly to said support.

12. A system according to claim 11, wherein said coupler comprises an L-shaped bracket having a first leg secured to said support, and having a second leg extending generally orthogonally from said first leg, said coupler further comprising a pair of quick connect couplings, each of which is provided on said second leg of said bracket and is selectively connectable to one of said inlet and outlet ports of said filter assembly.

13. A system according to claim 12, wherein each of said inlet and outlet ports comprises a nipple which extends from an end of said filter assembly and which has a shoulder formed thereon proximate said end and a reduced diameter portion extending axially away from said shoulder, said second leg of said bracket has a pair of receptacles formed therein, each of which comprises a hole having overlapping larger and smaller diameter portions, and each of said quick connect couplings comprises a housing having (i) an internal chamber capable of receiving the reduced diameter portion of one of said nipples and (ii) a boss capable of engaging the shoulder of said one nipple, the housing of each of said quick connect couplings being slidably connected to said second leg of said bracket so as to be movable from a position in which said reduced diameter portion and said shoulder of the respective nipple are freely insertable through said larger diameter portion of the respective receptacle to a position in which said reduced diameter portion is inserted through said smaller diameter portion of the respective receptacle and said shoulder is positioned between said second leg of said bracket and said boss.

14. A system according to claim 13, wherein each of said quick connect couplings further comprises a valve provided in the respective housing and openable upon the insertion of the respective nipple into the respective housing to permit the flow of water therethrough.

15. A system comprising:

(A) a refrigeration device having an insulated panel;

(B) a cold water dispenser extending out of said insulated panel; and (C) a filter assembly provided inside said insulated panel, said filter assembly including a housing charged with a granulated filtration medium and having an inlet port connected to a source of untreated water and an outlet port connected to said cold water dispenser, wherein said housing has devices formed in opposed side surfaces thereof which define means for reinforcing said filter housing while preventing the formation of channels in said filtration medium, said devices including a plurality of transversely extending ribs each formed from an indention in said housing and extending into said housing by a distance of less than 1/4 the diameter of said housing.

16. A system according to claim 15, wherein said refrigeration device comprises a freezer and said panel comprises a door of said freezer.

17. A system according to claim 15, wherein said filter housing is generally U-shaped and has a base and first and second legs each extending from said base and terminating in a free end, and wherein a plurality of said ribs are formed on the opposed side surfaces of each leg and are staggered with respect to one another such that each of at least some of the ribs on one of said side surfaces is disposed between adjacent ribs on the other of said side surfaces.

18. A system according to claim 15, wherein each of said ribs has a generally rectangular cross-section and is rounded at the corners.

19. A drinking water purification system comprising:

(A) a support;

(B) a source of untreated water;

(C) a dispenser for purified water; and (D) a filter assembly which is mounted on said support and which has an inlet port connected to said source of untreated water and an outlet port connected to said dispenser, said filter assembly including a relatively flat filter housing which is charged with a granulated filtration medium, which has said inlet and outlet ports provided thereon, and which has devices formed in opposed side surfaces thereof which define means for reinforcing said filter housing while preventing the formation of channels in said filtration medium, wherein said reinforcing devices include a plurality of transversely extending ribs and a plurality of generally cylindrical protrusions, formed in the opposed side surfaces of said housing, which extend into said filter housing, and wherein each of the protrusions on one of said opposed side surfaces of said filter housing is generally aligned with a protrusion on the other of said opposed side surfaces and extends approximately half way through said filter housing.

20. A drinking water purification system comprising:

(A) a support;

(B) a source of untreated water;

(C) a dispenser for purified water; and (D) a filter assembly having an inlet connected to said source of untreated water and an outlet connected to said dispenser, said filter assembly including a housing charged with a filtration medium and having an end cap having inlet and outlet ports provided thereon, each of said inlet and outlet ports including a nipple which extends from said end cap and which has a shoulder formed thereon proximate said end cap and a reduced diameter portion extending axially outwardly from said shoulder; and (E) a coupler for connecting said filter housing to said support, said coupler including (1) a bracket secured to said support, said bracket having a pair of receptacles formed therein, each of which comprises a hole having overlapping larger and smaller diameter portions, and (2) a pair of quick connect couplings, each of which is mounted provided on said bracket and selectively connectable to one of said nipples of said filter assembly, each of said quick connect couplings including a housing having (i) an internal chamber capable of receiving the reduced diameter portion of the respective one of said nipples and (ii) a boss capable of engaging the shoulder of said one nipple means for slidably mounting the housing of each of said quick connect couplings on said bracket, said means for slidably mounting defining means for moving the housing of each of said quick connect couplings from a position in which said reduced diameter portion and said shoulder of the respective nipple are freely insertable through the larger diameter portion of the respective receptacle to a position in which said reduced diameter portion is inserted through the smaller diameter portion of the receptacle and said shoulder is held between said bracket and said boss.

21. A drinking water purification system comprising:

(A) a support;
(B) a source of untreated water;
(C) a dispenser for purified water; and
(D) a filter assembly which is mounted on said support and which has an inlet port connected to said source of untreated water and an outlet port connected to said dispenser, said filter assembly including a relatively flat filter housing which is charged with a granulated filtration medium, which has said inlet and outlet ports provided thereon, and which has a plurality of generally cylindrical protrusions, formed in the opposed side surfaces of said housing, which extend into said filter housing and which define means for reinforcing said housing, each of the protrusions of one of said opposed side surfaces of said filter housing being generally aligned with a protrusion on the other of said opposed side surfaces and extending approximately half way through said filter housing.

* * * * *

UNITED STATES PATENT AND TRADEMARK OFFICE
CERTIFICATE OF CORRECTION

PATENT NO. : 5,320,752

DATED : June 14, 1994

INVENTOR(S) : Clack et al.

It is certified that error appears in the above-identified patent and that said Letters Patent is hereby corrected as shown below:

On the title page, item (75).

Please add "Paul Michael Pedersen" as an inventor.

Column 14, line 37, delete "transversely"; and
    line 42, delete "surface" and substitute therefore --surfaces--.
Column 16, line 67, delete "provided".
Column 17, line 6, after "nipple" insert a comma.

Signed and Sealed this

Twentieth Day of September, 1994

Attest:

BRUCE LEHMAN

Attesting Officer

Commissioner of Patents and Trademarks